Feb. 3, 1970  N. CZAJKOWSKI ET AL  3,492,920
VACUUM OPERATED FLUID DEVICE
Filed Jan. 25, 1968
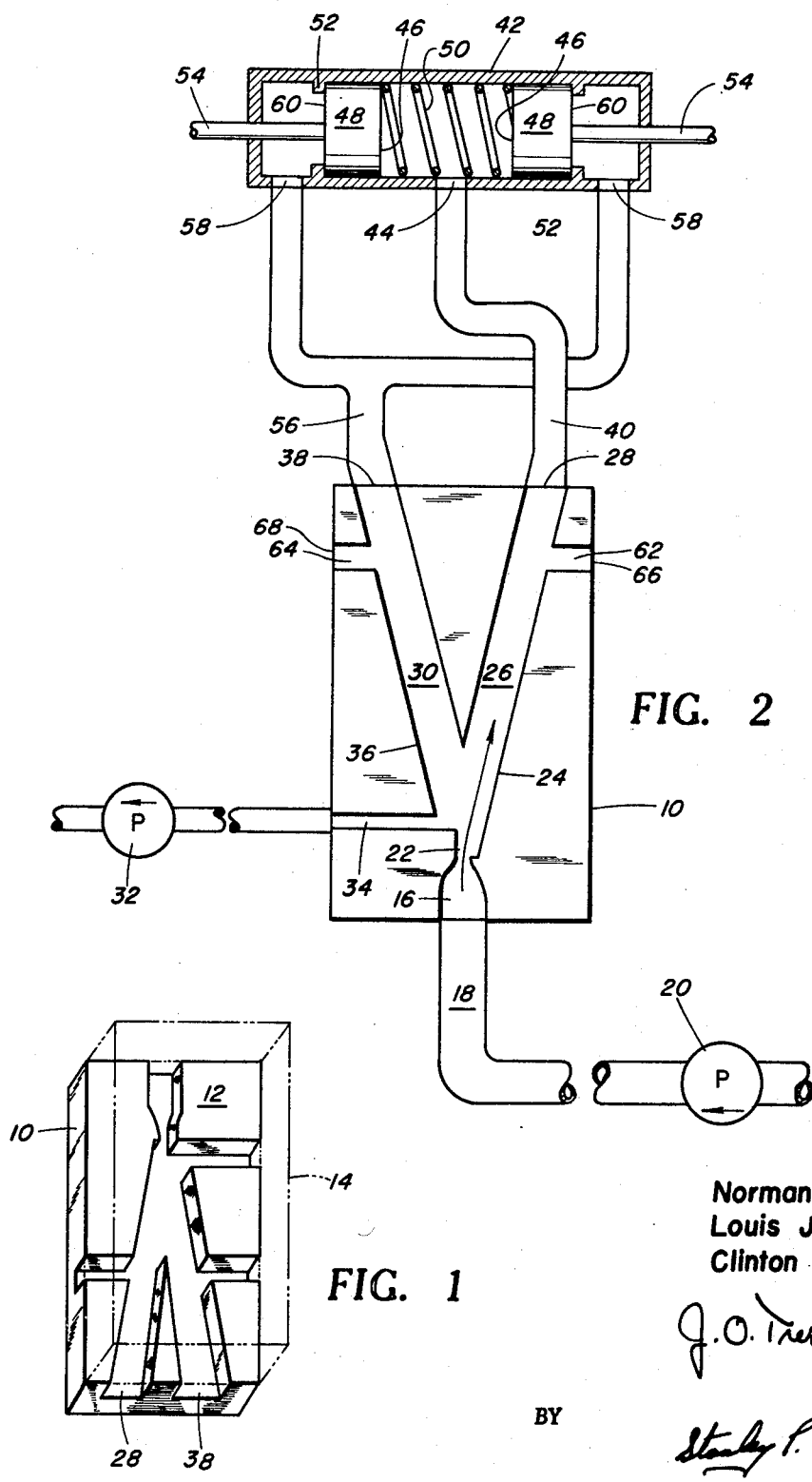
Norman Czajkowski
Louis J. deSabla
Clinton J. Sewell
INVENTOR

United States Patent Office 3,492,920
Patented Feb. 3, 1970

3,492,920
VACUUM OPERATED FLUID DEVICE
Norman Czajkowski, Chevy Chase, and Louis J. de Sabla and Clinton J. Sewell, Silver Spring, Md., assignors to the United States of America as represented by the Secretary of the Navy
Filed Jan. 25, 1968, Ser. No. 700,557
Int. Cl. F15b 13/02; F01b 7/02; F15c 1/08
U.S. Cl. 91—3                                4 Claims

ABSTRACT OF THE DISCLOSURE

A fluid device having an inlet for supplying fluid under pressure through an orifice to attach to a wall of a first outlet channel to exit therethrough. A vacuum control signal, located adjacent a second outlet channel, is applied to switch the input fluid flow from the first outlet channel into the second outlet channel.

BACKGROUND OF THE INVENTION

This invention relates generally to a fluid device and more particularly to a vacuum operated fluid device having a selectable alternating output.

Fluid apparatuses, having no moving parts except the fluid itself, have become well known in the prior art by the nomenclature fluidic gate or fluid amplifier. Many such devices have been used in the past to perform various functions under diverse environmental conditions. One such prior art device utilizes a single fluid input and two or more output channels, wherein a small pressure signal supplied between the input and output channels causes the fluid flow to switch from one output channel to the second output channel upon actuation of the switching signal. Such prior art devices have not been found wholly successful when used in a high pressure environment, since a leak in the pressure type switching signal line causes the fluid flow to switch from the first channel to the second channel inadvertently, by simulating the switching signal with the environmental pressure.

SUMMARY OF THE INVENTION

Accordingly, one object of this invention is to provide a new and improved vacuum operated fluid device.

Another object of the invention is the provision of a new and improved multi-output fluid device having a vacuum operated switching signal.

Still another object of the present invention is to provide a new and improved dual outlet fluid element having a vacuum operated switching signal for selectively directing fluid flow into only one channel at a time.

One other object of this invention is the provision of a new and improved dual outlet channel fluid device having fluid flow normally in one of the outlet channels and a vacuum operated switching signal associated with the other channel for selectively switching the fluid flow from the first channel into the second channel.

Still one other object of the present invention is the provision of a new and improved piston actuator having each side of the piston in fluid flow communication with an outlet of a vacuum operated dual outlet fluid element.

Briefly, in accordance with one embodiment of this invention, these and other objects are attained by a fluid device having an inlet for receiving fluid under pressure, a pair of outlets in open fluid communication with the inlet and capable of receiving fluid from the inlet, and a vacuum signal for selectively controlling fluid flow from the inlet to either of the outlets.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 1 is a perspective view, partially in phantom, of the fluid device of the present invention; and FIG. 2 is a diagrammatic plan view of the fluid device of the present invention in a fluid circuit.

DESCRIPTION OF THE PREFERRED EMBODIMENT

Referring now to the drawings wherein like reference characters designate identical or corresponding parts throughout the several views, and more particularly to FIG. 1 thereof wherein the fluid device of the present invention is shown as consisting essentially of a block member 10 having an upper surface 12 with various fluid channels defined therein, and a cover block member 14 secured thereto by conventional means such as adhesive. The manner in which the various fluid passages are provided in the upper surface 12 of block member 10 is not part of the instant invention, and any conventional means for providing fluid channels in fluidics devices may be utilized.

As more clearly shown in FIG. 2, the fluid device has an inlet channel 16 for receiving fluid under pressure from a conduit 18 supplied by a pump 20. The inlet channel 16 terminates in an orifice or gate passage 22, and the fluid exiting under pressure from the orifice 22 will attach to the nearest wall 24 due to the Coanda effect. The fluid attaching to wall 24 is directed into a first outlet channel 26 to exit from the block member 10 through an opening 28. When it is desired to switch the fluid flow from the first outlet channel 26 into a second outlet channel 30, a communicating vacuum pump 32 is put into operation to draw a vacuum within a signal channel 34 for attracting the fluid towards an attaching wall 36 in channel 30. When the vacuum signal 34 is in operation, the fluid flow ceases in channel 26, and the fluid under pressure exiting from orifice 22 will enter directly into outlet channel 30 to be directed toward exit opening 38. Thus, it can be seen, that fluid flow exists only in output outlet channel 26 when the vacuum signal 34 is not in operation, and exists only in outlet channel 30 when the vacuum signal 34 is in operation.

It will be obvious to one skilled in the art that a pressure leak developed in the signal line 34 will not cause the fluid flow to switch from outlet channel 26 to outlet channel 30 when utilized in a high pressure environment. However, had a conventional high pressure signal been utilized through wall 24 of the first outlet channel 26 to cause the fluid flow to switch from outlet channel 26 to outlet channel 30, a high pressure leak in the signal line will have caused fluid flow to switch from the first outlet channel to the second outlet channel.

One highly advantageous use of a device for selectively switching fluid flow from a first channel to a second channel is in the development of a novel piston actuator as hereinafter described. With the vacuum signal 34 inactive, fluid flow from orifice 22 through the first outlet channel 26 will exit through opening 28 into a conduit 40. Fluid under pressure in conduit 40 enters a fluid tight cylinder 42 through an opening 44 to apply a force against faces 46 of pistons 48. Biasing means, such as coil spring 50, assists the pressure source applied through opening 44 in maintaining pistons 48 in the extended position against stop members 52 to maintain rods 54, attached to pistons 48, in a fully extended position. When it is desired to retract piston rods 54, the vacuum signal 34 is applied by means of pump 32 to draw the fluid flow existing from orifice 22 toward attaching wall 36 such that the fluid flow ceases to exist in outlet channel 26 and flows only through the second outlet channel 30 to enter into a bifurcated conduit 56. The fluid under pressure thus applied to conduit 56 enters into cylinder 42 through openings 58, thus applying a force against the faces 60 of pistons 48 to act against biasing means 50. Since flow has ceased to exist in conduit 40 and only exists in conduit 56, there is no longer any force exerted by the fluid against faces 46 of pistons 48, but only against faces 60. The biasing means 50 is so chosen as to yield upon a force being applied against faces 60 of pistons 48 due to the pressure of the fluid in conduit 56. In this manner pistons 48 and rods 54 will move towards the center of cylinder 42 to retract the rods 54 from the extended position shown in FIG. 2. The rods 54 may be attached to operate a latching means for a cover member or door, or may be utilized for any conventional device wherein selective actuation is desired. To avoid overflow in outlet channels 26 and 30, and thus prevent fluid flow in both channels 26 and 30 simultaneously, overflow channels 62 and 64 are provided in the attaching walls 24 and 36 respectively to spill overflowing fluid from the block member 10 through openings 66 and 68.

Obviously, numerous modifications and variations of the above described preferred embodiment of the above described best mode or preferred embodiment of the invention, defined by the appended claims, may be made.

What is claimed as new and desired to be secured by Letters Patent of the United States is:

1. A fluid device comprising:
   inlet means for receiving fluid under pressure,
   first and second outlet means in open fluid communication with said inlet means and capable of receiving fluid from said inlet means,
   vacuum means for selectively controlling the fluid flow from said inlet means to either said first or said second outlet means,
   said inlet means and said first and second outlet means being arranged to effect fluid flow only in said first outlet means when said vacuum means is not in operation and fluid flow only in said second outlet means when said vacuum means in in operation,
   said inlet means terminating in an orifice opening towards said first and second outlet means and having a longitudinal axis through the center thereof,
   said first and second outlet means each having at least a portion thereof lying on opposite sides of said longitudinal axis of said orifice, and
   said vacuum means being in fluid flow communication with said device on the same side of said longitudinal axis as said second outlet means.

2. The device of claim 1 further comprising a hollow fluid tight cylinder, and
   a piston within said cylinder,
   said first and said second outlet means being in fluid flow communication with said cylinder on opposite sides of said piston.

3. A fluid device comprising an inlet channel terminating in an orifice and having a longitudinal axis,
   first and second outlet channels each having an inner and outer sidewall in fluid flow communication with said orifice and each having at least a portion thereof on opposite sides of said longitudinal axis of said inlet channel,
   a control channel intersecting said outer sidewall of said second outlet channel and being spaced from said orifice,
   a vacuum source connected to said control channel,
   said outer sidewall of said first outlet channel being sufficiently close to said orifice so that a fluid stream issuing from said orifice attaches itself only thereto when said vacuum is not in operation, and only to said outer sidewall of said second outlet channel when said vacuum is in operation, and
   first and second overflow channels communicating between the exterior of said fluid device and said first and second outlet channels respectively to provide overflow relief for said outlet channels.

4. The device of claim 3 further comprising a hollow fluid tight cylinder, and
   a piston within said cylinder,
   said first and second outlet channels being in fluid flow communication with said cylinder on opposite sides of said piston.

References Cited

UNITED STATES PATENTS

| | | | |
|---|---|---|---|
| 3,001,539 | 9/1961 | Hurvitz | 137—81.5 |
| 3,122,062 | 2/1964 | Spivak et al. | 91—3 |
| 3,270,758 | 9/1966 | Bauer | 137—81.5 |
| 3,283,768 | 11/1966 | Mannon | 137—81.5 |
| 3,328,959 | 7/1967 | Hackett | 92—75 |
| 3,353,562 | 11/1967 | Heskestad | 137—81.5 |
| 3,386,709 | 6/1968 | Drayer | 137—81.5 |

PAUL E. MASLOUSKY, Primary Examiner

U.S. Cl. X.R.

92—75; 137—81.5